(12) United States Patent
Kuzmin

(10) Patent No.: US 7,043,720 B2
(45) Date of Patent: May 9, 2006

(54) MECHANISM FOR REFORMATTING A SIMPLE SOURCE CODE STATEMENT INTO A COMPOUND SOURCE CODE STATEMENT

(75) Inventor: Aleksandr M. Kuzmin, Santa Clara, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 640 days.

(21) Appl. No.: 10/128,162

(22) Filed: Apr. 22, 2002

(65) Prior Publication Data

US 2003/0200534 A1    Oct. 23, 2003

(51) Int. Cl.
*G06F 9/44* (2006.01)

(52) U.S. Cl. ............ 717/137; 717/136; 717/141
(58) Field of Classification Search .......... 717/146, 717/109, 113, 131, 144, 116, 151, 130, 136, 717/137, 141; 715/519
See application file for complete search history.

(56) References Cited

U.S. PATENT DOCUMENTS 5,857,212 A * 1/1999 Van De Vanter ............ 715/519
2002/0184615 A1* 12/2002 Sumner et al. ............. 717/130

OTHER PUBLICATIONS

"Generation of Formatters for Context-Free Languages", Mark Van Den Brand and Eelco Visser, 1996, ACM,http://delivery.acm.org/10.1145/230000/226156/p1-van_den_brand.pdf?key1=226156&key2=0973801111&coll=ACM&dl=ACM&CFID=40939737&CFTOKEN=77392872.*
Gordon V. Cormack, "An LR Substring Parser for Noncorrecting Syntax Error Recovery", Proceedings of the ACM SIGPLAN 1989 Conference on Programming language design and implementation, pp. 161-169.*

* cited by examiner

*Primary Examiner*—Tuan Dam
*Assistant Examiner*—Chih-Ching Chow
(74) *Attorney, Agent, or Firm*—Hickman Palermo Truong & Becker, LLP; Christopher J. Brokaw

(57) ABSTRACT

A mechanism for reformatting a simple source code statement into a compound source code statement is provided. Tokens are identified in unformatted source code, which contains simple statements. A syntax tree is created from the identified tokens. The syntax tree is used to identify one or more simple statements. In processing a particular simple statement, potential statements are identified in the particular simple statement. A tree of blocks, which identifies block levels, is created from the potential statements. An intermediate textual representation is created where each of the potential statements is on a different line. Indentation levels, which correspond to the block levels in the tree of blocks, are associated with each of the potential statements. Formatted source code is created by inserting begin and end block indicators into the intermediate textual representation.

10 Claims, 9 Drawing Sheets

```
1   STRING1 = NEW STRINGBUFFER("                    "). APPEND(STRING1). TO
2   }
3   CHAR CH = OUTPUTLINE.CHARAT(0);
4   IF(CH == 125)
5
6       INDENT -= 4;
7   ELSE IF (INLABEL)
8       INDENT -= 2;
9   IF (INDENT < 0)
10
11
12          STRING2 = "";
13  ELSE IF (INDENT > = "
14          STRING2 = "
15  ELSE
16          STRING2 = "
17  FOR (INT K = 0; K < I; K++)
18
19
20
```

```
STRING1 = NEW STRINGBUFFER("           "). APPEND(STRING1). TO
}
CHAR CH = OUTPUTLINE.CHARAT(0);

IF (CH == 125)  {
    INDENT -= 4;
} ELSE IF (INLABEL)  {
    INDENT -= 2;
}

IF (INDENT < 0)  {
    STRING2 = "";
} ELSE IF (INDENT
         > = "
              .LENGTH ()){
    STRING2 =
              "
} ELSE {
    STRING2 =
              "
```

MECHANISM FOR REFORMATTING A SIMPLE SOURCE CODE STATEMENT INTO A COMPOUND SOURCE CODE STATEMENT

FIELD OF THE INVENTION

The present invention relates generally to computers and more specifically to a mechanism for reformatting a simple source code statement into a compound source code statement.

BACKGROUND OF THE INVENTION

The ultimate documentation for source code is the source code itself. Therefore, it is important that source code be formatted to be human readable. This has led to the development of formatting standards that specify how programmers are to format the source code. However, programmers frequently do not write source code that complies with these formatting standards. This has led to the development of tools for evaluating whether source code complies with the formatting standards and for reformatting the source code to produce source code that does comply. One of the problems in evaluating and reformatting source code is the existence of simple statements that should be reformatted into compound statements to enhance readability.

Transforming a simple statement into a compound statement involves transforming a single line of source code into multiple lines of source code, associating levels of indentation with each of the multiple lines of source code, and inserting begin and end block indicators, such as DO END pairs or left and right brackets. Transforming a simple statement into a compound statement makes the code much easier for a human to read and comprehend. The transformation, however, should not change the functionality of the code. That is, the compound statement should have the same functionality as the simple statement.

To the best of applicant's knowledge, prior art reformatters do not have the ability to automatically reformat simple statements into compound statements. Therefore, a need exists for such a capability.

SUMMARY

A mechanism is provided for reformatting a simple source code statement into a compound source code statement. According to one embodiment, tokens are identified in the unformatted source code that contains simple statements. A syntax tree is created from the identified tokens. The syntax tree is used to identify one or more simple statements. A particular simple statement, which is one line of source code, is analyzed to determine how to break it up into multiple lines of source code (hereinafter referred to as "potential statements"). A tree of blocks, which identifies block levels, is created from the potential statements. An intermediate textual representation is created where each of the potential statements is on a different line. Indentation levels, which correspond to the block levels in the tree of blocks, are associated with each of the potential statements. Formatted source code is created by inserting begin and end block indicators into the intermediate textual representation.

According to one embodiment, a percentage of code that does not comply with a formatting standard is derived by comparing unformatted source code, that contains simple statements, with formatted source code, that contains compound statements transformed from the simple statements. The total number of lines that are different between the unformatted source code and the formatted source code is calculated and divided by the total number of lines in the unformatted source code.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6A depicts unformatted source code;

FIG. 6B depicts formatted source code that complies with a formatting standard.

DETAILED DESCRIPTION OF EMBODIMENT(S)

A mechanism for reformatting a simple source code statement into a compound source code statement. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A System Overview

Figure 1:
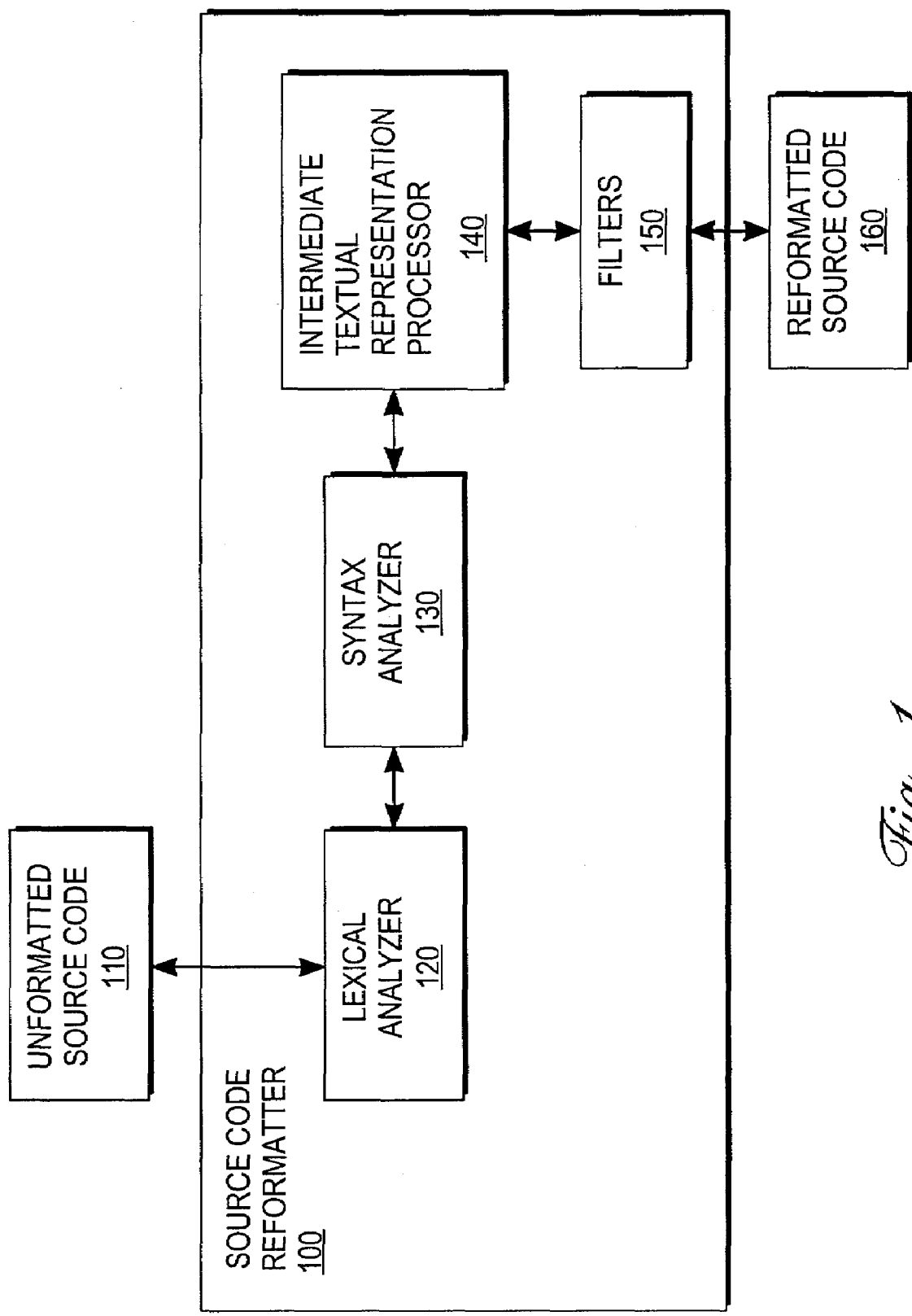
FIG. 1 is a block diagram of a source code reformatter according to one embodiment of the present invention.

FIG. 1 is a block diagram of a source code reformatter according to one embodiment of the present invention. The source code reformatter 100 includes stripped down versions of compiler parts for the lexical analyzer 120 and the syntax analyzer 130. The source code reformatter 100 uses the following functions from a compiler for the lexical analyzer 120 and the syntax analyzer 130: determination of tokens, creation of the syntax tree, and block analysis. The following compiler functions need not be included in the reformatter 100: code generation, verification of identifier names, placing identifier names in a dictionary, verification of inheritance blocks, and determination of whether variables are local or global to a block of code. The lexical analyzer 120 is enhanced to replace comments in unformatted source code 160 with a special character and to save the comment for later reinsertion. The syntax analyzer 130 is enhanced to handle the special character as will be described in more detail.

The lexical analyzer 120 separates characters of the unformatted source code 110 into groups that logically belong together; these groups are called tokens. The usual tokens are keywords, such as DO or IF, identifiers, such as variable names, operator symbols, such as <= or +, and punctuation symbols, such as parenthesis, brackets, and semicolons. Comments are replaced with a special character that indicates the position of the comments. The comments are saved in a buffer for later reinsertion.

The lexical analyzer 120 can be implemented as either a subroutine of the syntax analyzer 130 or as a separate entity. If it is a subroutine of the syntax analyzer 130, then it can pass the tokens one at a time to the syntax analyzer 130. Otherwise, the tokens are collected in a file and passed to the syntax analyzer 130 in the file. As depicted in FIG. 1, the lexical analyzer 120 is a separate entity from the syntax analyzer 130.

The syntax analyzer 130 groups the tokens together to produce syntactic structures. Often the syntactic structure can be regarded as a tree whose leaves are the tokens (referred to herein as a "syntax tree"). The interior nodes of the syntax tree represent strings of tokens that logically belong together.

The intermediate textual representation processor 140 takes a simple statement in the syntax tree and determines the potential statements that will be used to create a compound statement, and creates a tree of blocks that identifies block levels associated with the potential statements. The intermediate textual representation processor 140 uses the tree of blocks to create the intermediate textual representation where each of the potential statements are on a separate line and an indentation level is associated with each of the potential statements.

The filters 150 insert brackets into the intermediate textual representation at appropriate places to create a compound statement. Furthermore, the comments are reinserted at the positions of the special characters.

Reformatted source code 160 includes the compound statements that are created from the simple statements in the unformatted source code 110.

An Operational Example

Figure 5:
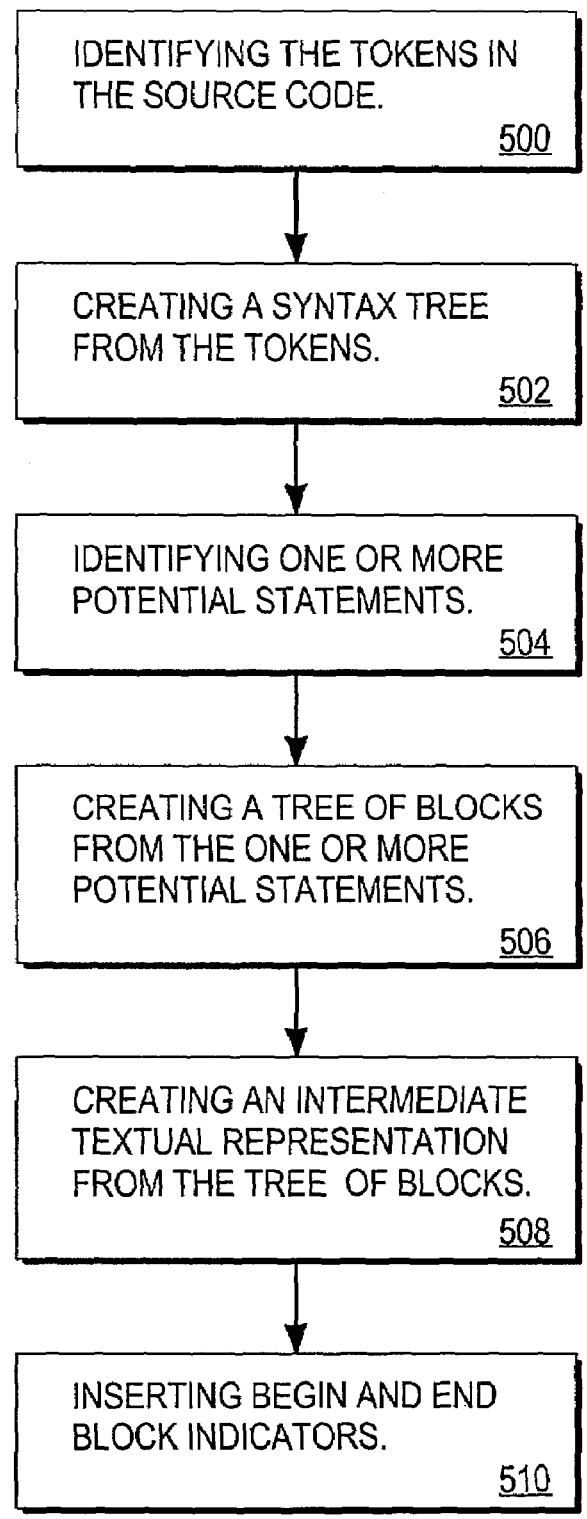
FIG. 5 is a flowchart illustrating the operational flow for transforming a simple statement into a compound statement in accordance with one embodiment of the present invention.

FIG. 5 is a flowchart illustrating the operational flow for transforming a simple statement into a compound statement in accordance with one embodiment of the present invention. A source code reformatter 100 receives unformatted source code 110, which contains simple statements, and produces reformatted source code 160, which contains compound statements derived from the simple statements.

Figure 2A:
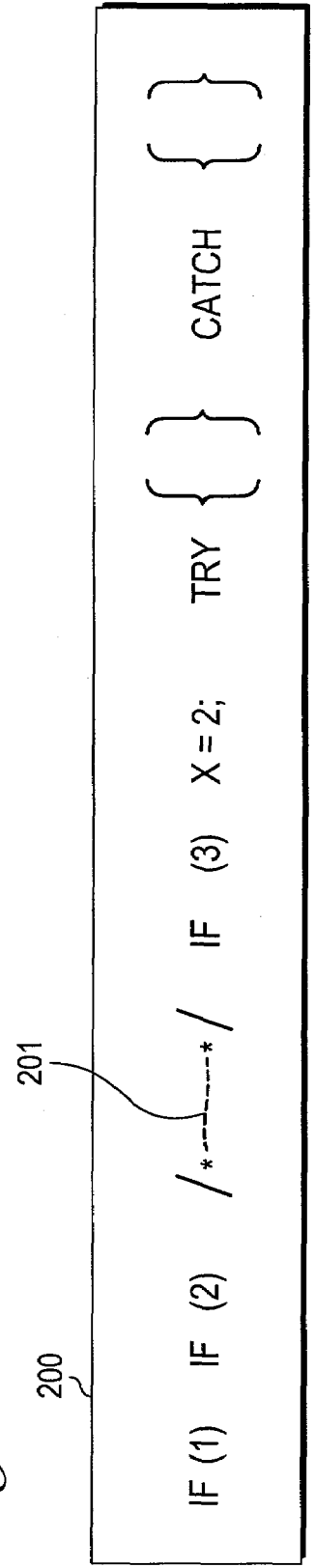
FIG. 2A depicts a sample set of unformatted source code that contains a single simple statement.

The lexical analyzer 120 is the first component in the source code reformatter 100 to receive the unformatted source code 110. FIG. 2A depicts a sample set of unformatted source code that contains a single simple statement. This simple statement 200 contains potential statements that can be used to create a compound statement, and contains a comment 201. The simple statement 200 has three nested conditions and a try catch combination that can be used to determine the potential statements as will be described in more detail hereinafter.

In step 500, the lexical analyzer 120 (1) reads each character in the simple statement 200, (2) identifies the tokens in the simple statement 200, (3) replaces the comment 201 with a special character 205, and (4) saves the comment 201 for later reinsertion as will be discussed in more detail. The main tokens of interest in simple statement 200 are:

(1) the three IF keywords,
(2) the literal X,
(3) the equals sign,
(4) the constant 2,
(5) the semicolon,
(6) the keyword TRY, and
(7) the keyword CATCH.

The lexical analyzer 120 places the tokens in a file and passes the file to the syntax analyzer 130.

In step 502, the syntax analyzer 130 analyzes the tokens in the file to create a syntax tree. The syntax tree maybe generated in the same manner as syntax trees are generated by existing compilers. The syntax analyzer 130 is modified to handle the special character 205. The syntax analyzer 130 passes the syntax tree to the intermediate textual representation processor 140.

Figure 2B:
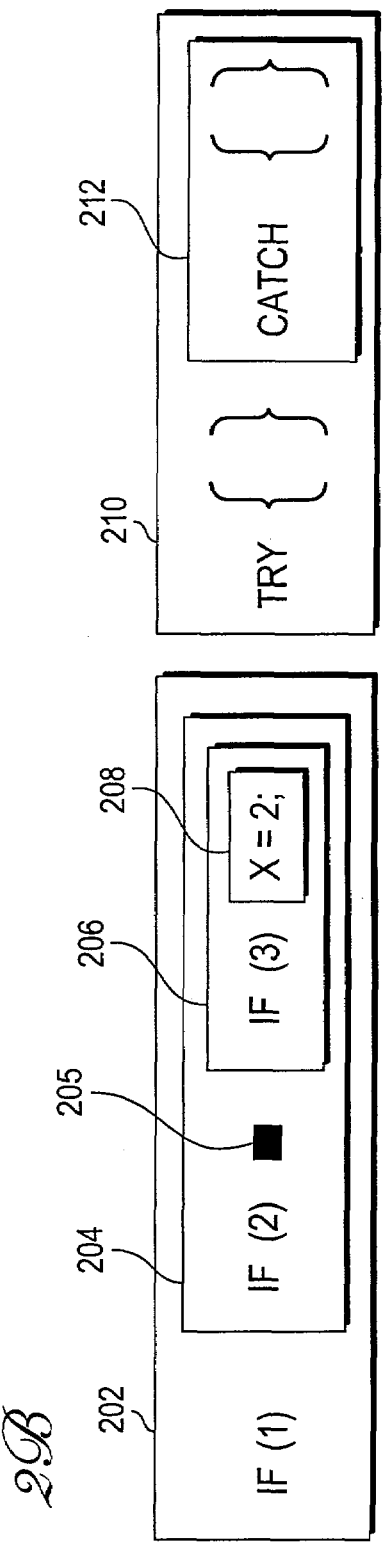
FIG. 2B is a block diagram of a simple statement, as depicted in FIG. 2A, where the blocks indicate the potential statements that are used to create a compound statement.

In step 504, the intermediate textual representation processor 140 uses the syntax tree to determine the potential statements for a compound statement and to identify, from the syntax tree, one or more potential statements for a particular simple statement. FIG. 2B is a block diagram of a simple statement, as depicted in FIG. 2A, where the blocks indicate the potential statements that are used to create a compound statement.

Since there are no brackets in the simple statement to indicate how to apply conditions to statements, the intermediate textual representation processor 140 uses the compiler rule that a condition only applies to the statement directly below it (hereinafter referred to as "the rule"). In order to determine what conditions apply to what statements, the intermediate textual representation processor 140 needs to find a standalone statement and process the simple statement backwards from the standalone statement. A standalone statement is a syntactically complete statement and therefore can be compiled into executable code without reference to other statements or conditions.

For example, the semicolon after the constant "2" is used to determine that the "X=2;" 208 is a standalone statement. Following the rule of a condition applying to one statement, the "IF (3)" only applies to the standalone statement, "X=2;" 208. The standalone statement, "X=2;" 208, is combined with the "IF (3)" to produce a first new statement, "IF(3) X=2;" 206, and "IF (2)" applies to this first new statement. "IF(3) X=2;" 206 is combined with "IF(2)" to produce a second new statement, "IF(2) IF(3) X=2;" 204, and "IF(1)" applies to this second new statement. "IF(2) IF(3) X=2;" 204 is combined with "IF(1)" to produce a third new statement, "IF(1) IF(2) IF(3) X=2;" 202.

In the case of a try catch combination, the catch belongs to the try because there is nothing to catch unless a try is performed. Therefore, the catch 212 is inside of try 210.

Figure 3A:
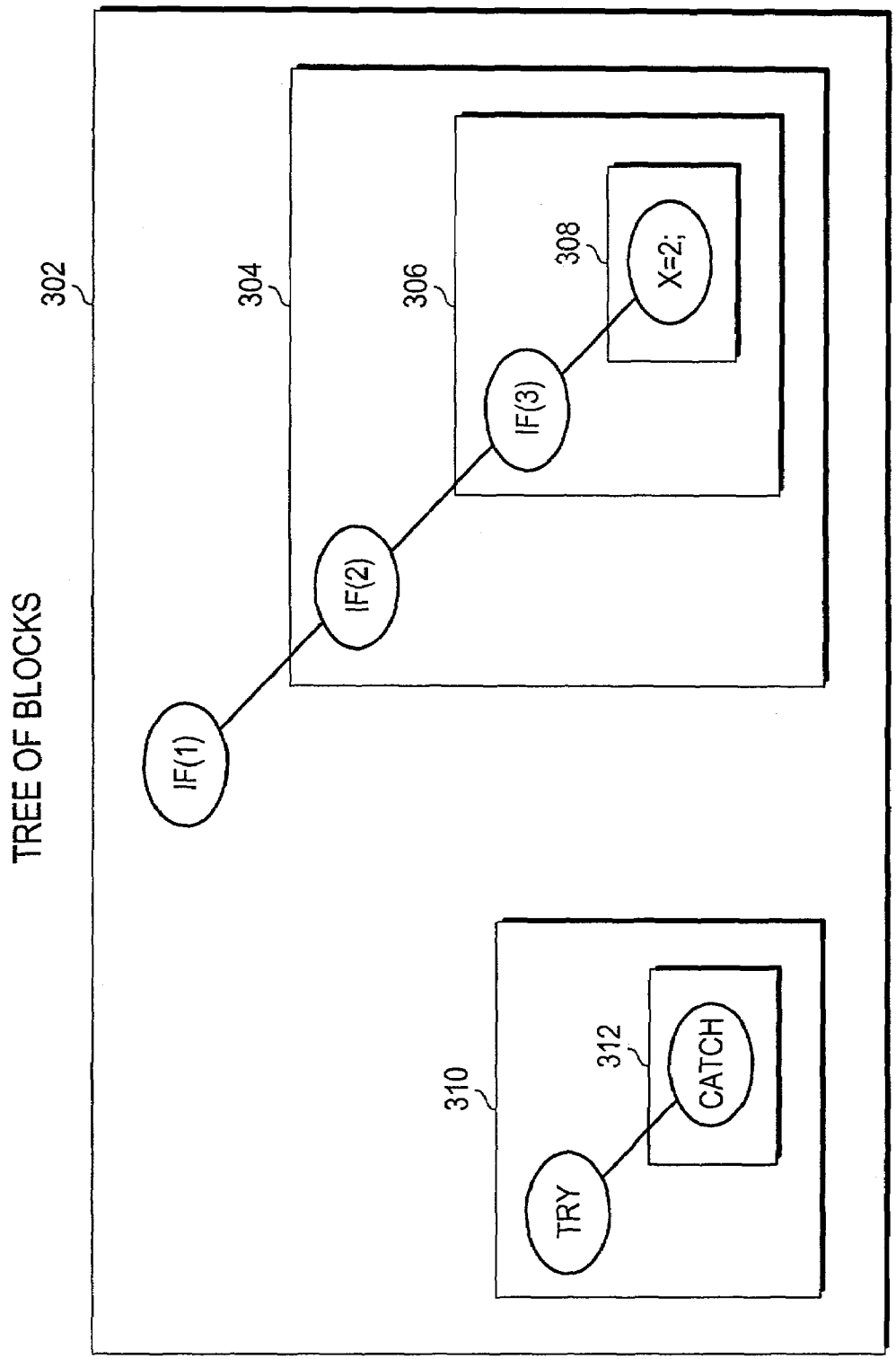
FIG. 3A is a block diagram of a tree of blocks for the potential statements in FIG. 2B.

In step 506, the intermediate textual representation processor 140 uses the identified potential statements, as shown in FIG. 2B, to create a tree of blocks. FIG. 3A is a block diagram of a tree of blocks for the potential statements in FIG. 2B. Each block contains a potential statement and indicates the indentation level associated with that potential statement.

As can be seen, the standalone statement in "X=2;" block 308 is at the deepest block level. "The rule" is used to place the conditions in the appropriate block levels. Therefore, "X=2;" block 308 is in "IF (3)" block 306, "IF (3)" block 306 is in "IF (2)" block 304, and "IF (2)" block 304 is in "IF "(1)" block 302. Once all of the conditions in the blocks 306, 304, and 302 have been applied to the process, it is apparent that the "try block 310" is at the same level as "IF (1)" block 302. The "catch" block 312 is inside of the "try" block 310 because there is nothing to catch unless a try is performed.

Figure 3B:
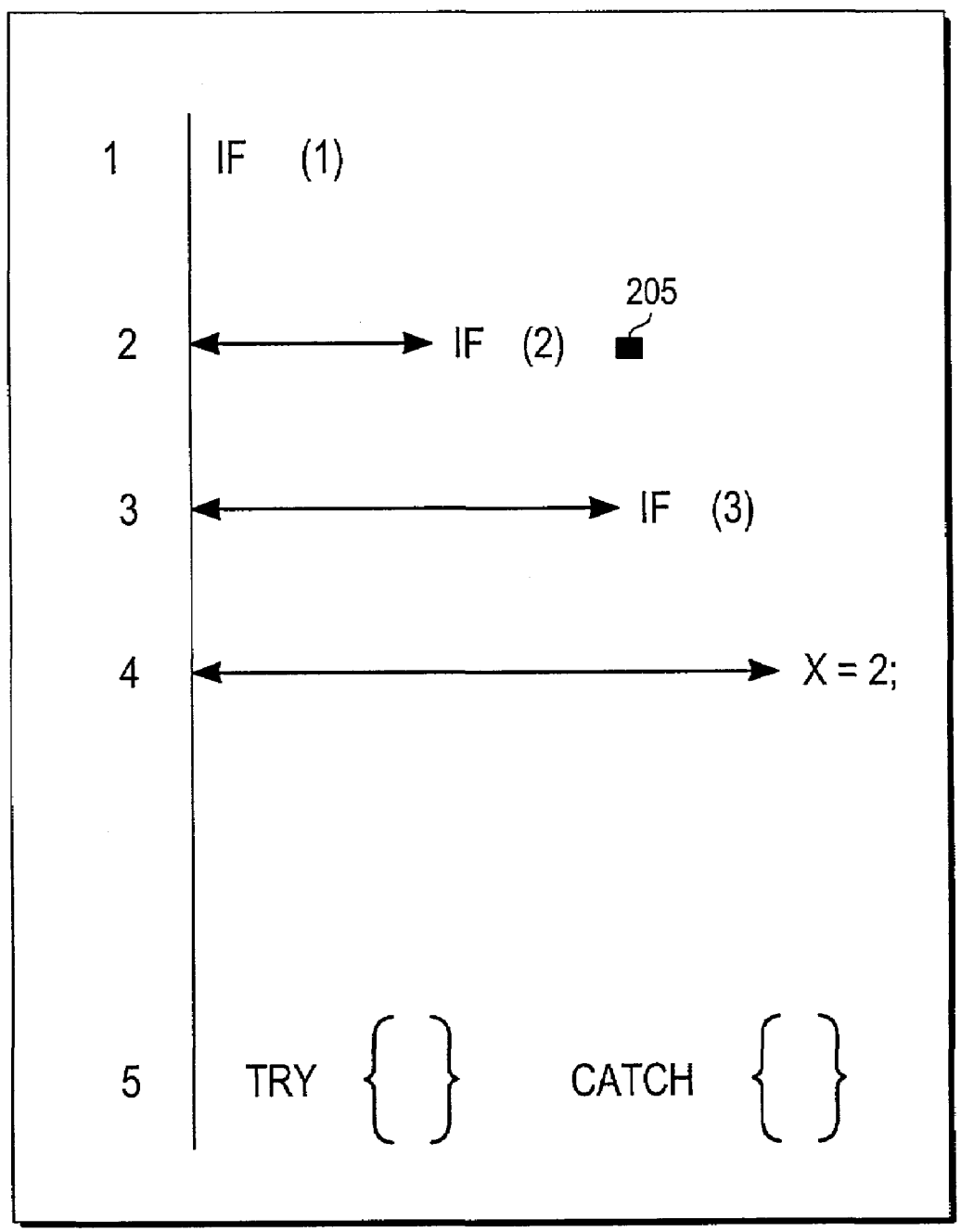
FIG. 3B depicts an intermediate textual representation that is created from the tree of blocks as depicted in FIG. 3A.

At step 508, the intermediate textual representation processor 140, uses the tree of blocks to produce an intermediate textual representation. FIG. 3B depicts an intermediate textual representation that is created from the tree of blocks as depicted in FIG. 3A. Each potential statement in the intermediate textual representation is placed on a separate line and an indentation level is associated with each of the potential statements.

For example, "IF(1)" block 302 and "try" block 310 are at the outermost level of the tree of blocks; therefore, potential statement 1, e.g., IF (1), and potential statement 5, e.g., try { } catch { }, are placed at the zero indentation level in the intermediate textual representation. "IF (2)" block 304 is at the next block level so potential statement 2 is at the first indentation level in the intermediate textual representation. "IF (3)" block 306 is at the next block level so potential statement 3 is at the second indentation level. "X=2;" block 308 is at the next block level so potential statement 4, e.g., "x=2;", is at the third indentation level.

Figure 4:
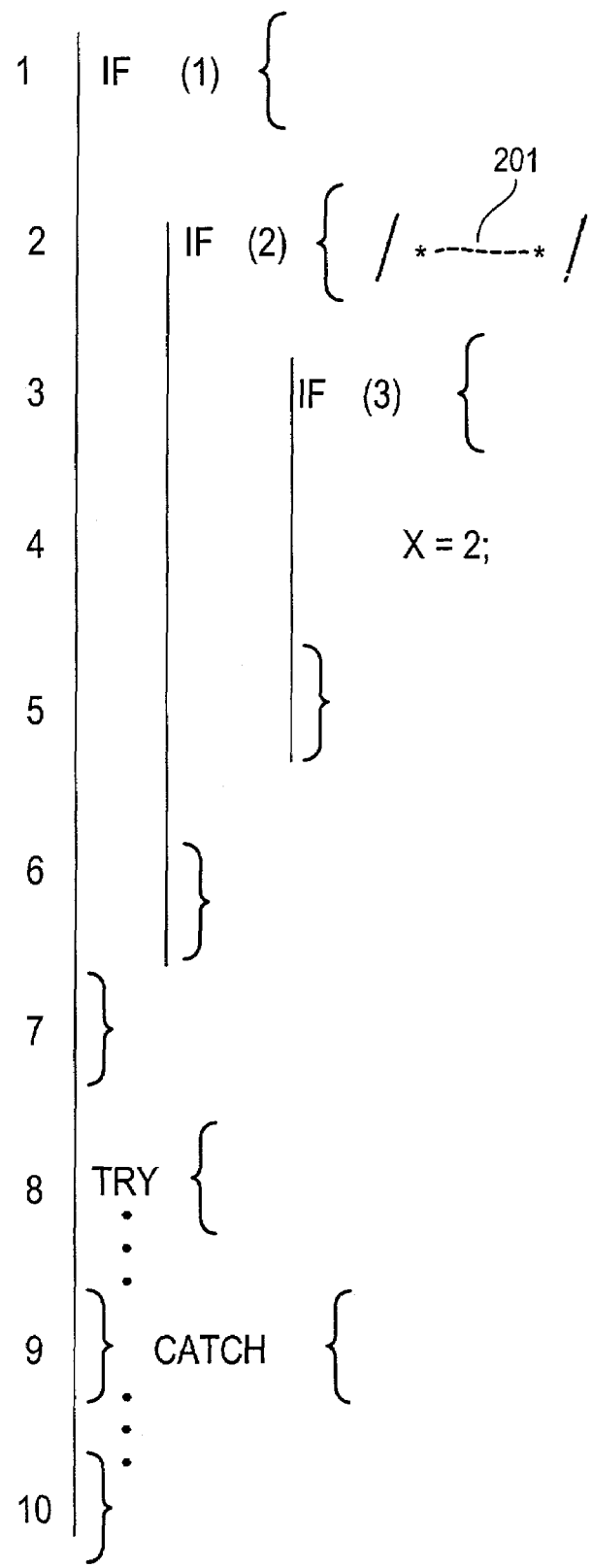
FIG. 4 depicts reformatted source code produced from the intermediate textual representation as depicted in FIG. 3B.

In step 510, the intermediate textual representation processor 140 transmits the intermediate textual representation to the filters 150. The filters 150 (1) insert begin and end block indicators, such as brackets, into the intermediate textual representation, and (2) replace the special character 205 with the saved comment 201 to produce reformatted source code 160. FIG. 4 depicts reformatted source code produced from the intermediate textual representation as depicted in FIG. 3B. In conformance to "the rule", left brackets are inserted on source lines 1, 2, and 3, and right brackets are inserted on source lines 5, 6, and 7.

Determining the Percentage of Code that does not Comply with a Formatting Standard FIG. 6A depicts unformatted source code and FIG. 6B depicts formatted source code that complies with a formatting standard. To determine the percentage of code that does not comply with the formatting standard, the total number of lines that are different (referred to hereinafter as "the total number of different lines") between the unformatted source code 602 and the formatted source code 604 are counted, and divided by the total number of lines in the unformatted source code 602. To determine the total number of different lines, each line of unformatted source code 602 is compared with the analogous line in the formatted source code 604.

For example, lines 1–3 are the same in the unformatted source code 602 and the formatted source code 604. However line 4 of the unformatted source code 602 lacks a left bracket in comparison with the analogous line, "if (ch==125) {", in the formatted source code 604. Line 6 is the same between the formatted source code 604 and the unformatted source code 602. However line 7 of the unformatted source code 602 lacks a left and right bracket in comparison with the analogous line, "} else if (inLabel) {", in the formatted source code 604. Line 8 is the same between the formatted source code 604 and the unformatted source code 602. However line 9 of the unformatted source code 602 lacks a right bracket in comparison with the analogous line, "if (indent<0) {", in the formatted source code 604. Line 12, 'string2=""' is the same in both the unformatted source code 602 and the formatted source code 604. However, lines 13–17 in the unformatted source code 602 are different from the analogous lines in the formatted source code 604. For example, line 13 in the unformatted source code 602 is "else if (indent>=" whereas the analogous line in the formatted source code 604 is "} else if (indent", line 14 in the unformatted source code 602 is 'string2="> whereas the analogous line in the formatted source code 604 is "string2=", etc.

Therefore, in this example, the lines that are different are 4, 7, 9, 13–17, which equals 8 total number of different lines. Then the total number of different lines is divided by the total number of lines in the unformatted source code 602, which in this example is 20. So the percentage of code that does not comply with formatting standards is 8/20, which equals 40%.

Hardware Overview

Figure 7:
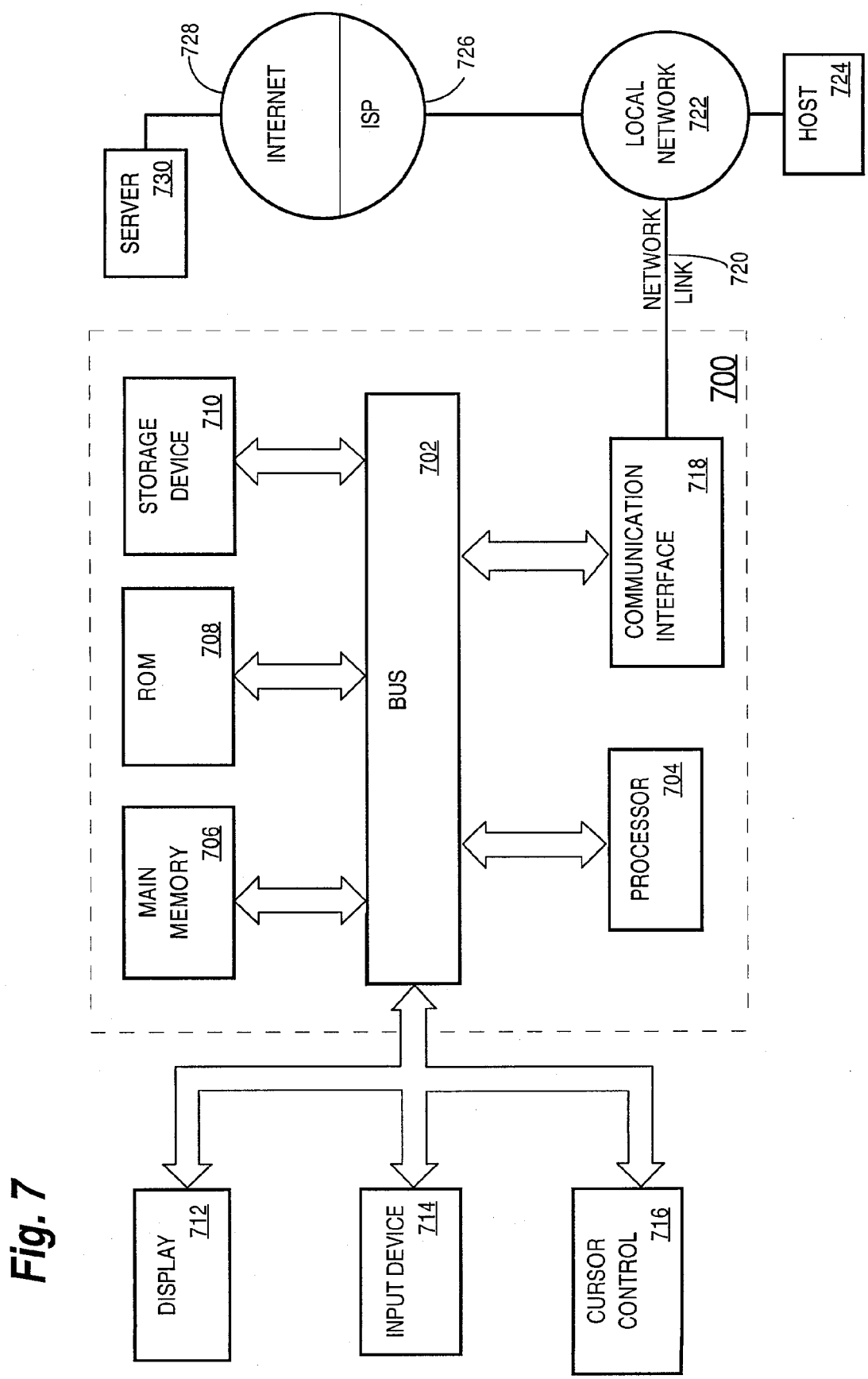
FIG. 7 is a block diagram of a computer system on which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method for transforming a simple statement into a compound statement, comprising:
   identifying, using a lexical analyzer, one or more tokens in a set of source code;
   creating a syntax tree from the one or more tokens;
   identifying, from the syntax tree, one or more potential statements for a particular simple statement by:
   (a) identifying a particular standalone statement, in the particular simple statement, that is the last standalone statement, and setting the last standalone statement as a current standalone statement, and
   (b) processing the particular simple statement backwards from the current standalone statement by iteratively applying a conditional statement that precedes the current standalone statement in the set of source code to identify a new current standalone statement until all potential statements in the particular simple statement are identified, wherein each potential statement, of the one or more potential statements, is to be rendered on a separate line;
   creating a tree of blocks for the one or more potential statements, wherein the tree of blocks identifies block levels associated with each of the one or more potential statements;
   creating an intermediate textual representation from the tree of blocks, wherein an indentation level is associated with each of the one or more potential statements and each of the indentation levels is derived from the block level; and
   inserting begin and end block indicators into the intermediate textual representation to create a compound statement.

2. The method of claim 1, wherein the begin and end block indicators are left and right brackets and inserting the begin and end block indicators comprises inserting the left and right brackets into the intermediate textual representation to create the compound statement.

3. The method of claim 1, wherein identifying the one or more potential statements further comprises replacing a comment in the particular simple statement with a special character.

4. The method of claim 3, wherein creating the syntax tree further comprises ignoring the special character.

5. The method of claim 3, wherein inserting further comprises replacing the special character with the comment.

6. A computer readable medium, comprising:
   instructions for causing one or more processors to determine, during execution of a set of computer code, an instruction that is executed;
   instructions for causing one or more processors to identify one or more tokens in a set of source code;

instructions for causing one or more processors to create a syntax tree from the one or more tokens;

instructions for causing one or more processors to identify, from the syntax tree, one or more potential statements for a particular simple statement by:
- (a) identifying a particular standalone statement, in the particular simple statement, that is the last standalone statement, and setting the last standalone statement as a current standalone statement, and
- (b) processing the particular simple statement backwards from the current standalone statement by iteratively applying a conditional statement that precedes the current standalone statement in the set of source code to identify a new current standalone statement until all potential statements in the particular simple statement are identified, wherein each potential statement, of the one or more potential statements, is to be rendered on a separate line;

instructions for causing one or more processors to create a tree of blocks for the one or more potential statements wherein the tree of blocks identifies block levels associated with each of the one or more potential statements;

instructions for causing one or more processors to create an intermediate textual representation from the tree of blocks wherein an indentation level is associated with each of the one or more potential statements and each of the indentation levels is derived from the block levels; and instructions for causing one or more processors to insert begin and end block indicators into the intermediate textual representation to create a compound statement.

7. The computer readable medium of claim 6, wherein the begin and end block indicators are left and right brackets and wherein instructions for causing one or more processors to insert the begin and end block indicators comprises instructions for causing one or more processors to insert the left and right brackets into the intermediate textual representation to create the compound statement.

8. The computer readable medium of claim 6, wherein instructions for causing one or more processors to identify the one or more potential statements further comprises instructions for causing one or more processors to replace a comment in the particular simple statement with a special character.

9. The computer readable medium of claim 8, wherein instructions for causing one or more processors to create the syntax tree further comprises instructions for causing one or more processors to ignore the special character.

10. The computer readable medium of claim 8, wherein instructions for causing one or more processors to insert further comprises instructions for causing one or more processors to replace the special character with the comment.

* * * * *

UNITED STATES PATENT AND TRADEMARK OFFICE
CERTIFICATE OF CORRECTION

PATENT NO. : 7,043,720 B2  Page 1 of 1
APPLICATION NO. : 10/128162
DATED : May 9, 2006
INVENTOR(S) : Aleksandr M. Kuzmin It is certified that error appears in the above-identified patent and that said Letters Patent is hereby corrected as shown below:

On the title page item (56), insert under:

References Cited

- - "Improving Computer Porgram Readablility to Aid Modification", James L. Elshoff and Michael Marcotty, 1982, ACM. "http://delivery.acm.org/10.1145/360000/358596/p512-elshoff.pdf?key1=358596&key2=5426601111&coll=ACM&dl=ACM&CFID=40939737&CFTOKEN=77392872" - -

- - "Programmable Formatting of Program Text: Experience Drawn form the TAMPR System", Kenneth W. Dritz, Oct. 1978, "http://delivery.acm.org/10.1145/810000/806433/p71-dritz.pdf?key1=806433&key2=6095601111&coll=ACM&dl=ACM&CFID=40939737&CFTOKEN=77392872" - -

Signed and Sealed this

Fifteenth Day of August, 2006

JON W. DUDAS
*Director of the United States Patent and Trademark Office*